United States Patent [19]
Haddow et al.

[11] 3,797,751
[45] Mar. 19, 1974

[54] SPRAYERS FOR LIQUIDS
[75] Inventors: Thomas Haddow, Padiham; Eric Gates, Nelson, both of England
[73] Assignee: Joseph Lucas (Industries) Limited, Birmingham, England
[22] Filed: July 3, 1972
[21] Appl. No.: 268,892

[30] Foreign Application Priority Data
July 2, 1971    Great Britain..................... 31076/71

[52] U.S. Cl................................. 239/426, 239/434
[51] Int. Cl.............................................. B05b 7/00
[58] Field of Search.................... 239/426, 434, 433; 60/39.74 R

[56] References Cited
UNITED STATES PATENTS
1,087,741   2/1914   Eckland............................. 239/433
2,973,150   2/1961   Golec, Jr. ......................... 239/433 X Primary Examiner—M. Henson Wood, Jr.
Assistant Examiner—Andres Kashnikow
Attorney, Agent, or Firm—Holman & Stern

[57] ABSTRACT

A liquid sprayer for use in a gas turbine engine, in which liquid is supplied through a tube to a passage extending transversely of the tube towards a slot adjacent an end wall of the passage. A conduit supplies air externally of the passage towards an end wall thereof which is defined by a surface aligned with the slot. An outlet for fuel and air mixed at said surface is provided in a side wall of the conduit adjacent said surface.

5 Claims, 2 Drawing Figures

PATENTED MAR 19 1974

3,797,751

SPRAYERS FOR LIQUIDS

This invention relates to sprayers for liquids and has as an object to provide a sprayer in a convenient form.

According to the invention a sprayer for a liquid comprises a body having a passage for the liquid, an end wall across one end of the passage, an opening in a side wall of the passage adjacent said end wall, said opening extending transversely of the axis of the passage adjacent the end wall, a surface extending externally of said passage and aligned with said opening on a downstream side thereof, a conduit through which air can flow so as to be directed onto the said surface and an outlet for liquid/air mixture adjacent said surface.

An example of the invention will now be described with reference to the accompanying drawings, in which.

Figure 1:
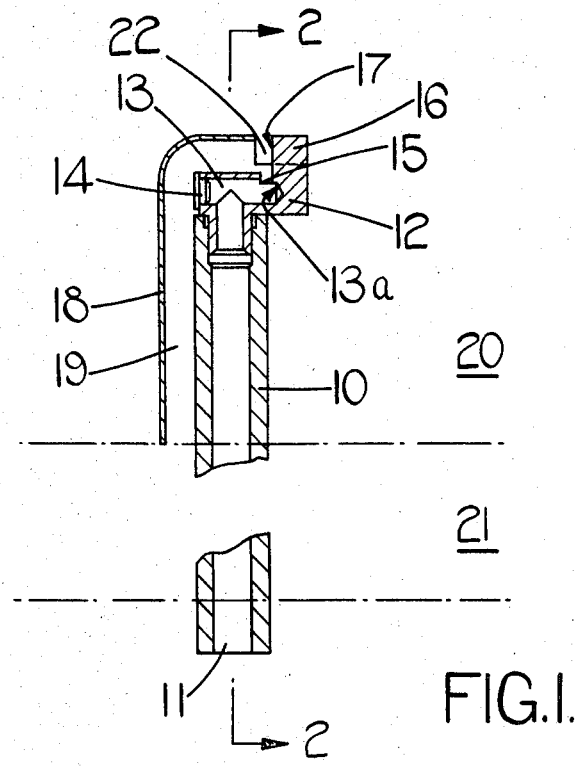
FIG. 1 is a longitudinal section through a sprayer.
Figure 2:
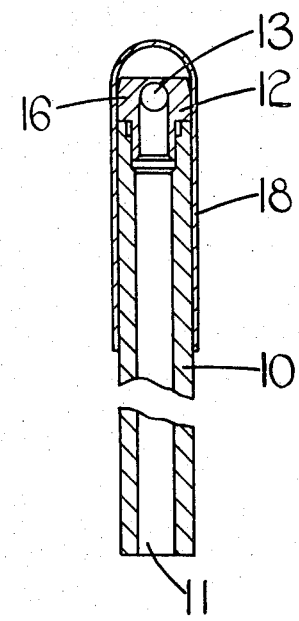
FIG. 2 is a section on line 2—2 in FIG. 1.

The sprayer has a tube 10 with an inlet 11 at one end and a nozzle body 12 sealingly secured to the other end. The body 12 has a passage which communicates with the tube 10 and is in the form of a blind bore 13 having a blanking plug 14 at its free end. The tube 10 extends transversely with respect to the axis of the passage. A slot 15 extends through a side wall of bore 13 adjacent an end wall 13a thereof. The longer dimension of slot 15 extends perpendicular to the axis of bore 13.

Body 12 includes a portion 16 having a surface 17 which extends outwardly of the downstream side of slot 15 so as to be aligned therewith and lies in a plane perpendicular to the axis of bore 13. A sheet-metal member 18 in the form of a cowl sealingly encloses one side of tube 10 and extends around body 12 to define a conduit 19 which is directed at one end towards the surface 17 which forms an end wall across the conduit 19.

The sprayer is particularly adapted for use in a combustion chamber 20 of a gas turbine engine and, in use, fuel is supplied to the end of tube 10 remote from the body 12. The conduit 19 opens at an upstream end thereof into an annular air space 21 surrounding the combustion chamber 20 and thus receives air from the space 21. Fuel leaves the bore 13 via the slot 15 and is atomized as a result of impingement on the surface 17. Air from the space 21 passes along the conduit 19 to impinge on the surface 17.

Both fuel and air leave the surface 17 an intimately mixed flat, symmetrical fan-shaped spray and leave the sprayer via an outlet 22 in the conduit 19 adjacent the surface 17 and aligned with the opening in the side wall of the passage.

It has been found that a satisfactory spray pattern is obtainable even when the surface 17 is only a short distance from the axis of tube 10. The device thus provides an extremely compact sprayer.

We claim:

1. A sprayer for liquid comprising a body having a passage for liquid, an end wall across one end of the passage, an opening in a side wall of the passage adjacent said end wall, said opening extending transversely of the axis of the passage adjacent the end wall, a surface extending externally of said passage and aligned with said opening on a downstream side thereof, a conduit through which air can flow so as to be directed onto said surface and an outlet for liquid/air mixture adjacent said surface.

2. The sprayer according to claim 1, wherein said surface forms an end wall extending across the conduit and the outlet for liquid/air mixture is provided in the conduit adjacent said surface and aligned with the opening in the side wall of the passage.

3. The sprayer according to claim 1, wherein a tube for supplying liquid to the passage in the body extends transversely with respect to the axis of the passage and has an axis which is displaced from the said surface.

4. The sprayer according to claim 3, wherein the conduit has an upstream portion which extends longitudinally of the tube and externally thereof.

5. The sprayer according to claim 1, wherein the passage is in the form of a blind bore in the body and a blanking plug closes the opposite end of the passage to the said end wall.

* * * * *